June 27, 1967     C. E. STAPLES     3,328,580
RAPID TRANSIT SPEED CONTROL SYSTEM
Filed July 14, 1964     6 Sheets-Sheet 1
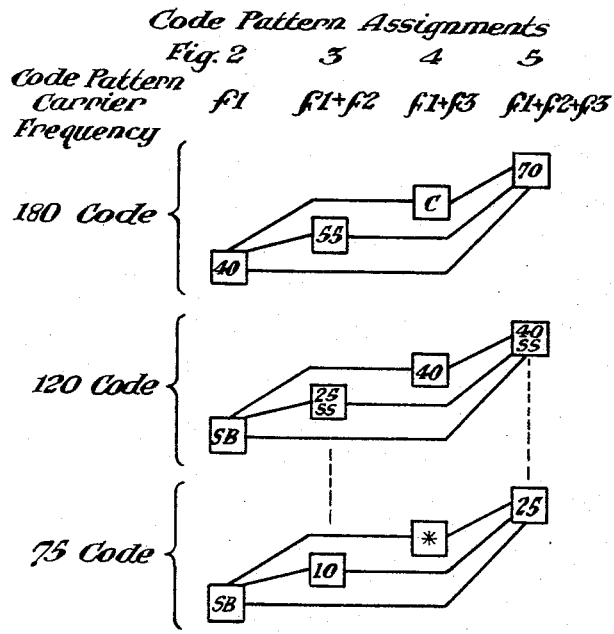
Fig.1.
Code Patterns
Fig. 2.
Fig. 3.
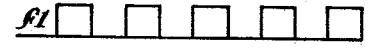
Fig. 4.
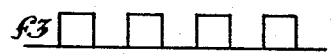
Fig. 5.
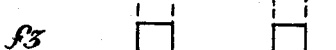
Speed Limits
| Code Rate | Pattern Fig. | Speed Maximum | MPH Minimum | Remarks |
|---|---|---|---|---|
| 180 | 5 | 70 | 65 | |
| 180 | 4 | 55 | 35 | Coast |
| 180 | 3 | 55 | 50 | |
| 180 | 2 | 40 | 35 | |
| 120 | 5 | 40 | 35 | Station Stop |
| 120 | 4 | 40 | 35 | |
| 120 | 3 | 25 | 20 | Station Stop |
| 120 | 2 | 0 | ~ | Service Braking. |
| 75 | 5 | 25 | 20 | |
| 75 | 4 | ~ | ~ | * Spare |
| 75 | 3 | 10 | 5 | |
| 75 | 2 | 0 | ~ | Service Braking. |
| No Code | | 0 | ~ | Emergency Braking. |
Fig.6.
INVENTOR.
Crawford E. Staples
BY W. L. Stout
HIS ATTORNEY

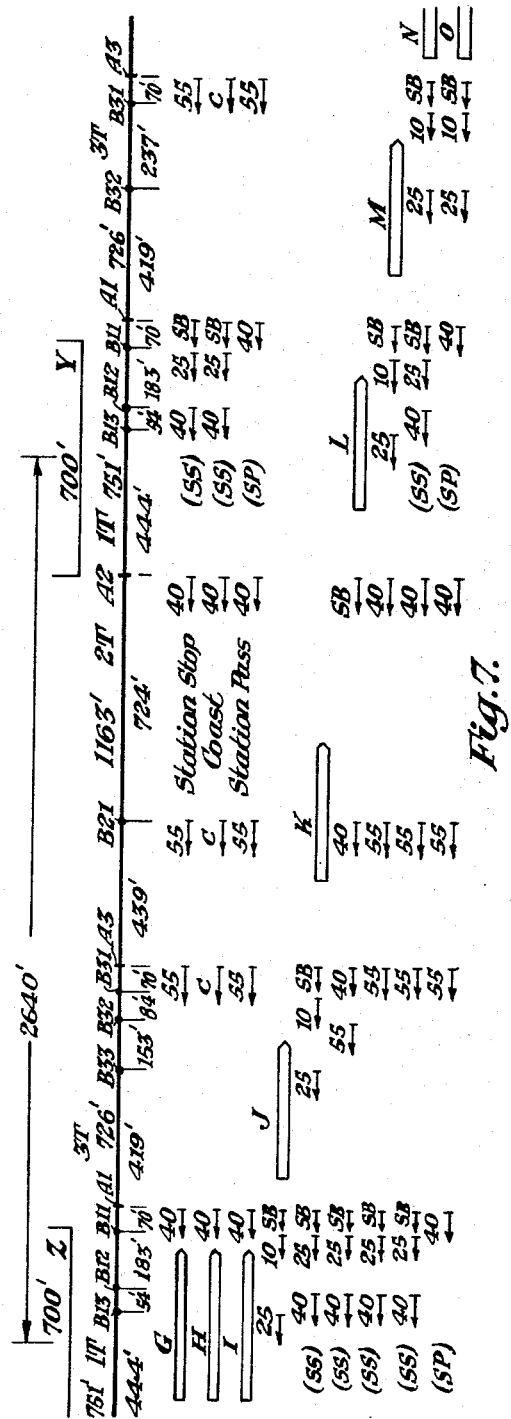

INVENTOR.
Crawford E. Staples
BY
W. L. Stout
HIS ATTORNEY

INVENTOR.
Crawford E. Staples.
BY W. L. Stout
HIS ATTORNEY

United States Patent Office 3,328,580
Patented June 27, 1967

3,328,580
RAPID TRANSIT SPEED CONTROL SYSTEM
Crawford E. Staples, Edgewood, Pa., assignor to Westinghouse Air Brake Company, Swissvale, Pa., a corporation of Pennsylvania
Filed July 14, 1964, Ser. No. 382,620
18 Claims. (Cl. 246—34)

My invention relates to a rapid transit speed control system.

The most widely used form of railroad signaling and control system is the type wherein block signaling sections are established utilizing insulated rail joints in one or both of the track rails, and employing one or both track rails as a conductor for a suitable signaling circuit commonly referred to as a track circuit. The length of the block sections and the location of the insulated joints are determined according to a number of factors, for example, traffic frequency, maximum permissible speed limits, braking distance under the most severe conditions, environmental factors, safety distance required between trains, and the location of station platforms for freight or passengers. By using existing track circuits, it is both difficult and expensive to make provision for higher speed rail travel without also making provision for the increased braking distance required. It is also difficult and expensive with existing track circuits to provide for additional train commands without drastically overhauling the system. Such additional train commands might include a signal for a decrease in speed upon the train entering a curve, compensation for the lengths of trains in determining whether a train may proceed into a train block section having a restrictive signal, and a signal to decrease headway between a train leaving a station platform and one entering, to name a few. Furthermore, with the increased usage of continuously welded track rail with its attendant economy it has become highly desirable to have a speed control system which requires few or no insulated joints.

Accordingly, it is an object of this invention to provide a new and improved rapid transit speed control system.

It is another object of this invention to provide a new and improved speed control system which can be adapted to existing track circuits to provide additional train commands.

It is a further object of this invention to provide a new and improved speed control system which utilizes a plurality of signaling frequencies of different code patterns and transmitted at different code rates to provide a large number of train commands.

It is still a further object of this invention to provide a new and improved speed control system for trains running on two-rail return continuously welded track rails.

It is still another object of this invention to provide a new and improved speed control system which can be readily adapted to computer controlled operation.

It is another object of this invention to provide new and improved train-carried apparatus for a speed control system utilizing a plurality of transmitting frequencies, code patterns, and code rates.

It is an additional object of this invention to provide a new and improved speed control system with restrictive speed zone control for curves or other such areas.

Briefly, the present invention accomplishes the above cited objects by providing a means for supplying the track rails with a plurality of carrier frequencies transmitted in pulses of various code patterns and a plurality of code rates to provide a large number of train commands. A primary or master frequency is established at the exit end of a block or detector section, this frequency being fed to the track rails in pulses of approximately equal "on-off" times at a code rate in accordance with track conditions in advance of the train. According to the present invention this frequency is always present and the absence thereof results in a brake application by train-carried equipment. Interposed between a train entering a section and the master frequency transmitter are one or more transmitters, each having its own auxiliary frequency, and each transmitting according to the signal desired to be transmitted to the train. One or more of the auxiliary frequencies can also be supplied to the track rails at the exit end of the detector section along with the master frequency, if desired. The auxiliary frequencies are transmitted to the track rails separately or alternately during the "off" time of the master frequency, and are generally in the audio range to prevent losses from interference and permit the usage of lower power components. The train-carried equipment includes pickup coils inductively associated with the track rails, the coils being responsive to the range of frequencies encompassed in the master and auxiliary frequencies. The output of the pickup coils is simultaneously fed to a plurality of amplifiers, the number being determined by the total of the signaling frequencies being utilized, including the master frequency. Each amplifier is tuned to respond to a given frequency and the output of the amplifier, when energized, energizes a frequency responsive decoding unit, the output of which controls a relay. The output of the master frequency responsive amplifier is simultaneously fed to additional code responsive decoding units, the number of such units being one less than the total number of code rates employed. The code responsive decoding units, when energized, actuate the respective relays connected to the outputs thereof. Thus, depending upon the number of frequencies present in the track rails and the particular code rate being employed, the appropriate decoding units and the respective relays associated therewith are energized to cumulatively perform a cab signaling and/or train control function.

Further objects, features, and advantages of my invention will become apparent as the description proceeds when taken in connection with the drawings in which:

FIG. 1 is a diagrammatic representation of one set of train commands possible at different code rates;

FIGS. 2 through 5 show diagrammatically the various code patterns indicated in FIG. 1;

FIG. 6 shows in tabular form the number of commands available utilizing three frequencies and three code rates;

Figure 10:
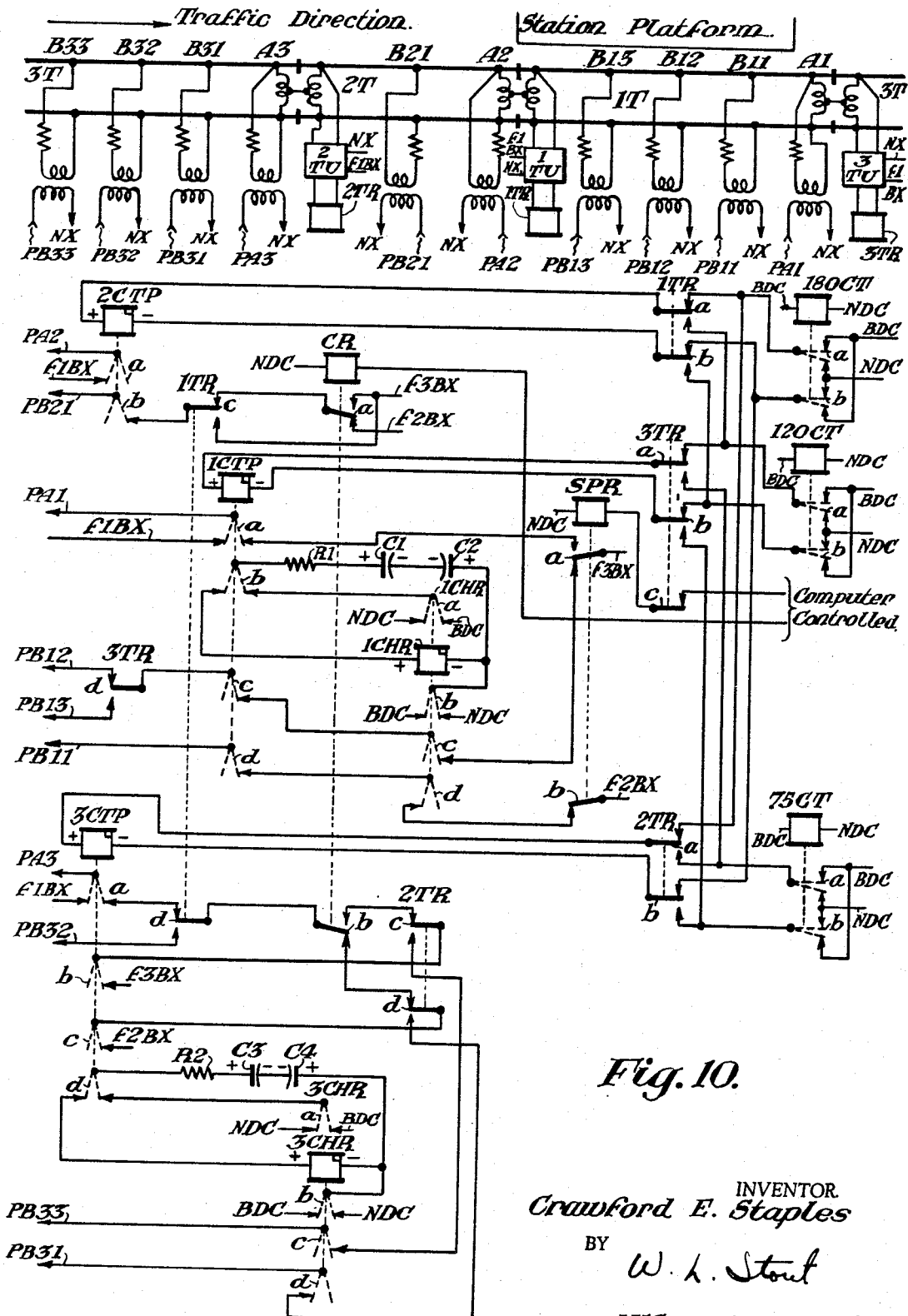
Figure 12:
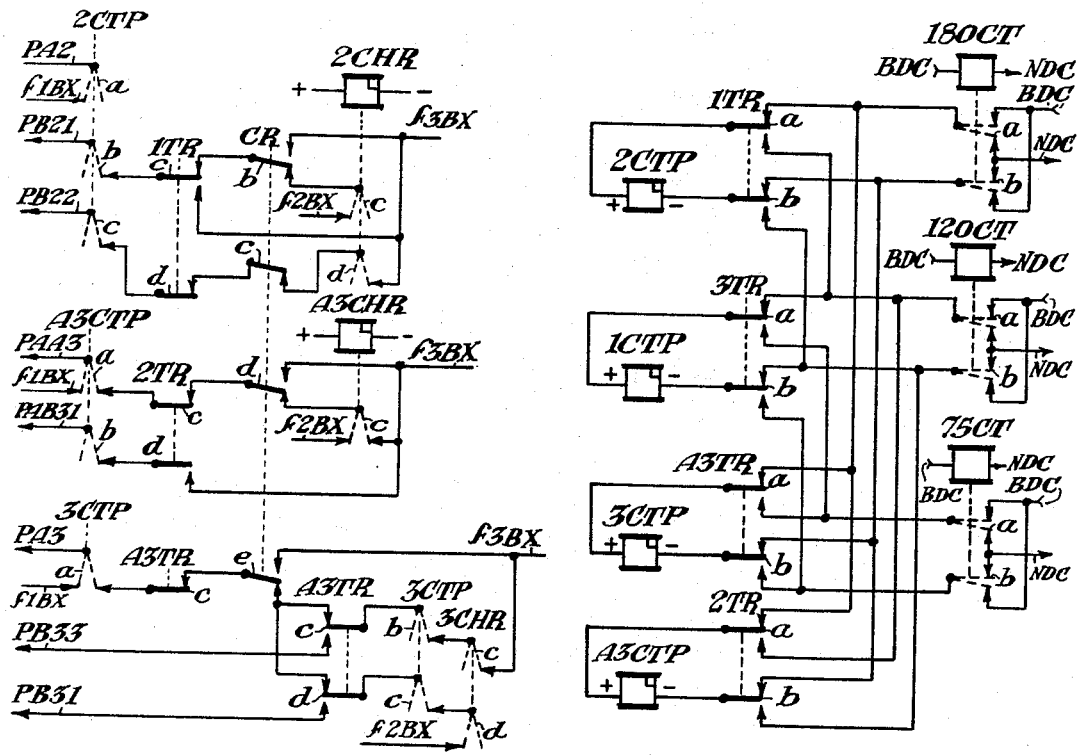
Figure 11:
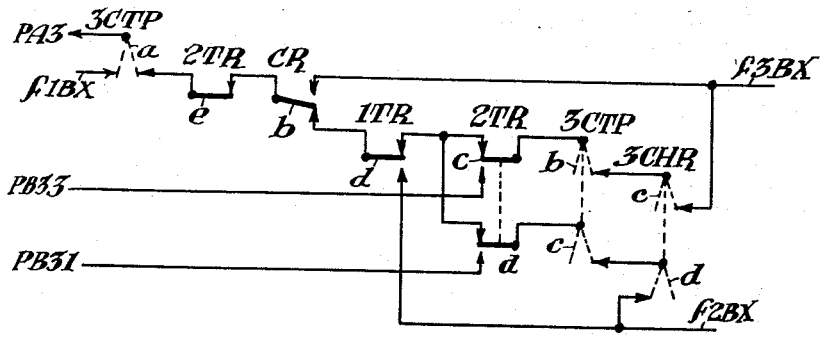
Figure 13:
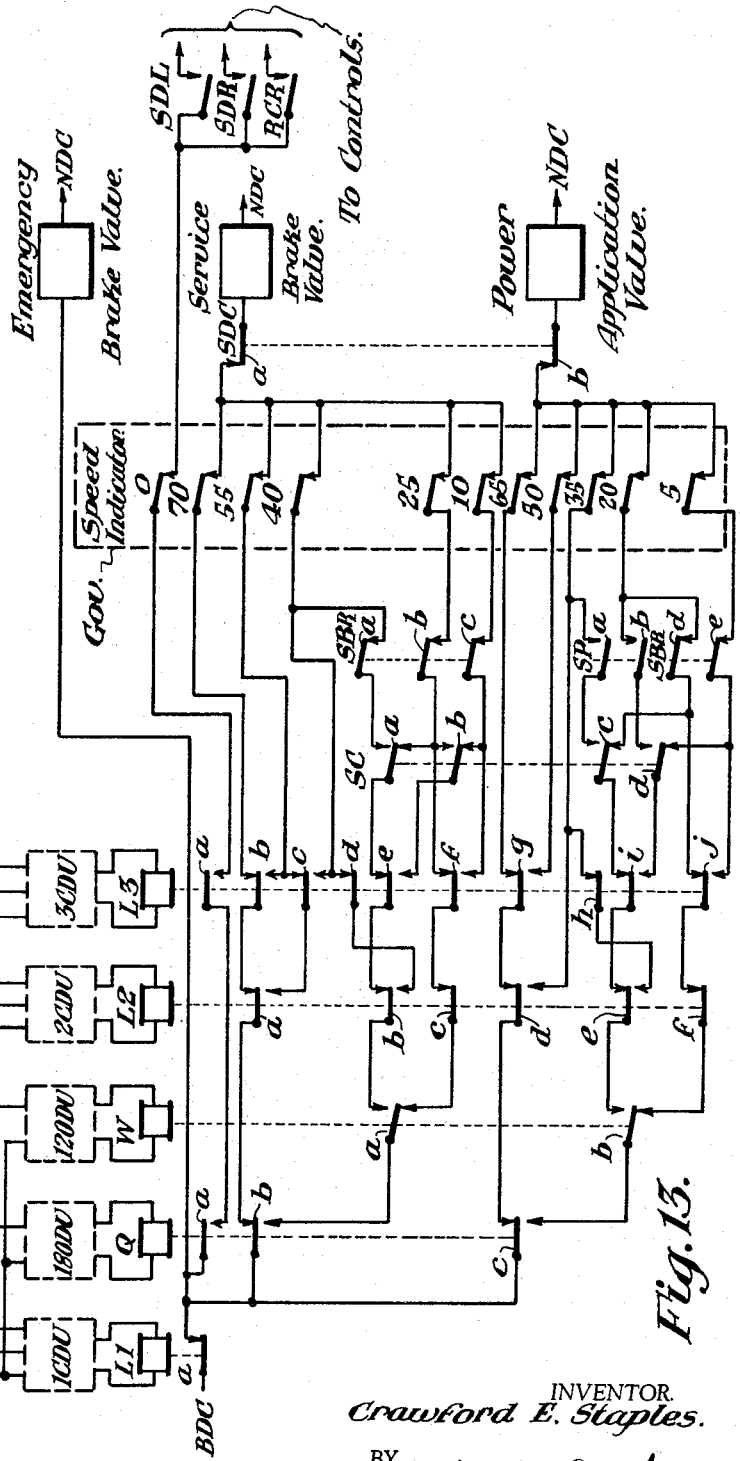
Figure 14:
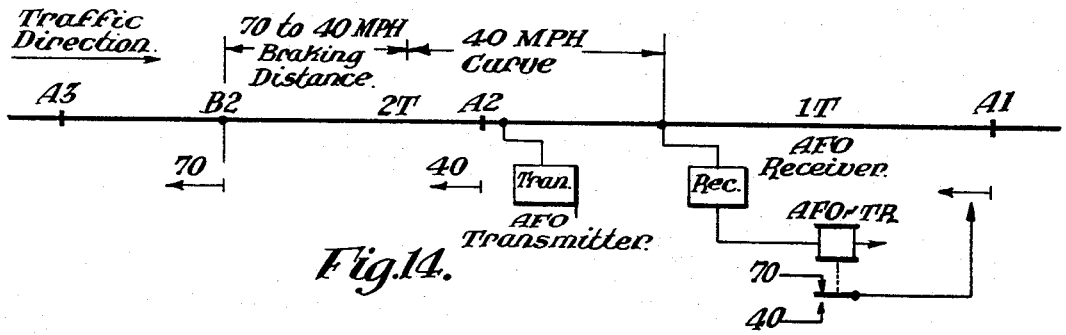
Figure 15:
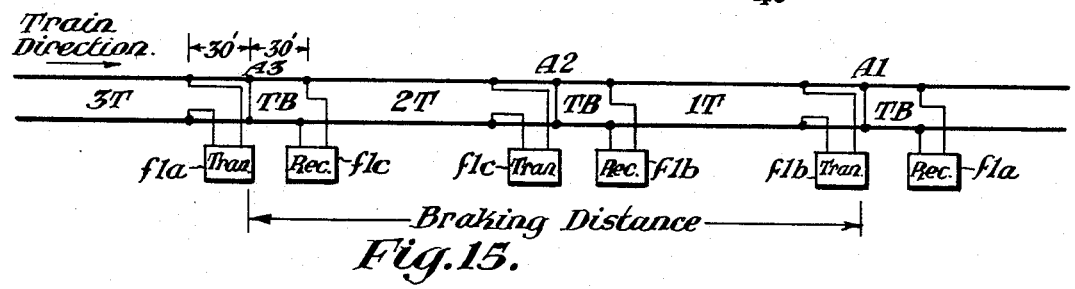
Figure 16:
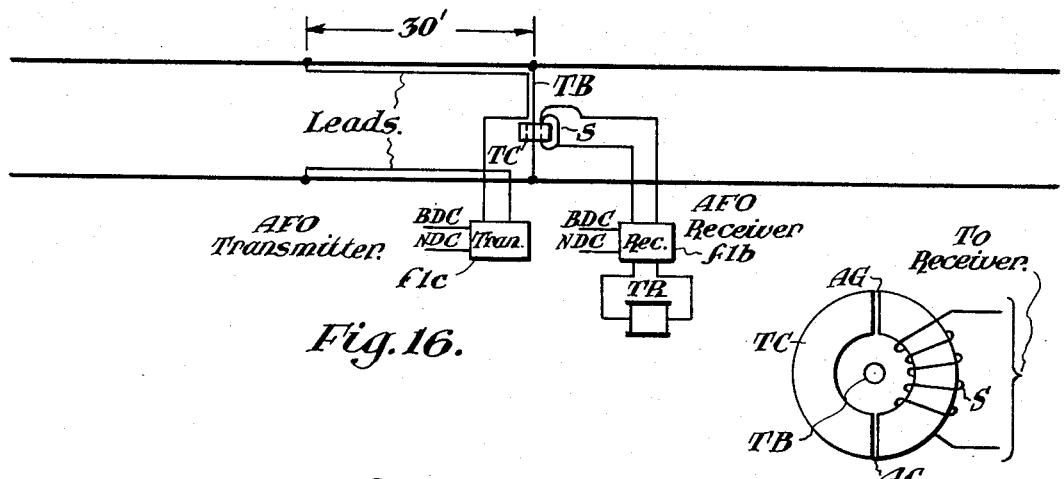
Figure 17:
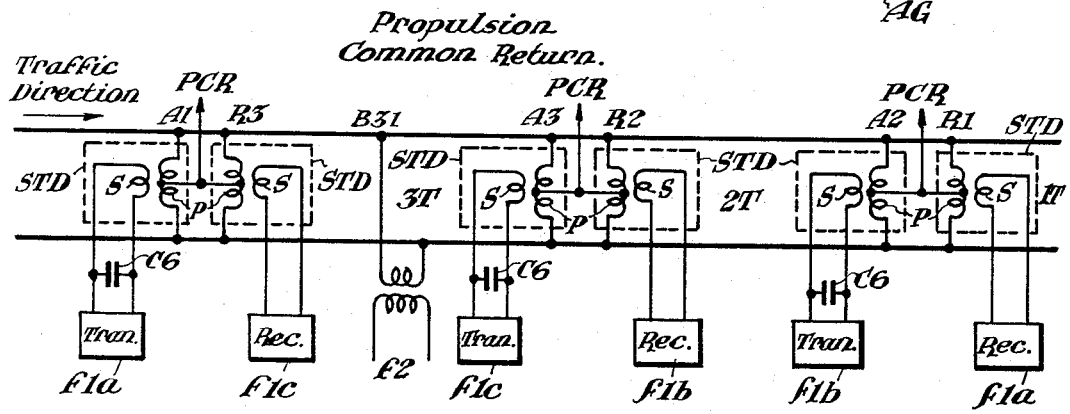

FIGS. 7 through 9 diagrammatically illustrate typical applications and the train commands present with a train in a number of different positions;

FIG. 10 shows schematically the wayside control circuit for FIG. 7;

FIG. 11 shows schematically a variation in the wayside circuit of FIG. 10 for the track circuit represented by FIG. 8;

FIG. 12 shows schematically variations in the circuit of FIG. 10 for a wayside control circuit for the track circuit represented in FIG. 9;

FIG. 13 is a schematic drawing of the train-carried equipment;

FIG. 14 shows diagrammatically a speed control system for rapid transit trains to regulate curve speed;

FIG. 15 shows a diagrammatic representation of a detector section arrangement using audio frequency circuits and continuously welded track rails;

FIG. 16 shows diagrammatically a detector section arrangement which checks the integrity of the bond; and FIG. 17 is a schematic diagram of the basic system used in a two-rail return continuously welded rail track circuit.

Similar reference characters refer to similar parts in each of the several views.

Referring now to the drawings, FIGS. 1 through 6 show the various signal aspects which can be obtained by employing a primary or master frequency $f1$ and two auxiliary frequencies $f2$ and $f3$ and three code rates designated 180, 120 and 75 which signify a 180 per minute code, a 120 per minute code, and a 75 per minute code, respectively. These code rates are intended to be illustrative and other code rates may be employed. The frequencies $f1$, $f2$ and $f3$ are preferably in the audio range, for instance, 1000 to 5000 cycles per second. However, the frequencies may be higher or lower as desired but must be sufficiently different to enable the proper type train-carried equipment to detect their presence. Frequencies other than audio frequencies could result in interference problems for which provision would have to be made, resulting in a more complex and more expensive system. FIG. 1 shows a diagrammatic representation of the number of signal aspects available with three different code rates 180, 120 and 75 when a master frequency and two auxiliary frequencies are used. The system is designed according to the total number of frequencies received by the train, with the master frequency $f1$ being applied at the exit end of a block or detector section, so that $f1$, the master frequency, is being continually supplied to the locomotive through the inductive pickup coils of the train-carried equipment which will be discussed later. The auxiliary frequencies $f2$ and $f3$ are fed to the rails at points intermediate the entrance end of a detector section and the exit end of a detector section, in any combination desired according to the signal aspect to be transmitted to the train. The auxiliary frequencies can also be applied at the same location as the master frequency as will be demonstrated as the description proceeds. Connected to the tracks at the entrance end of a detector section is a decoding unit where the master frequency $f1$ and a suitable track relay actuate wayside equipment. The details of this arrangement will be discussed more specifically as the description proceeds.

In FIG. 1, the horizontal designations are the corresponding code patterns for FIGS. 2 through 5 and the vertical designations represent the three code rates desired, where each individual block with a character therein represents a typical speed aspect for signals. For example, with code rate 180 the most restrictive aspect is indicated by the block showing the presence of master frequency $f1$, with a speed indicated therein of 40 miles per hour. With the presence of auxiliary frequency $f3$ within a detector section in addition to the master frequency $f1$, the signal aspect would be "coast" as indicated by the letter C, with the corresponding code pattern being shown in FIG. 4. With the train-carried equipment picking up frequencies $f1$ and $f2$, a signal aspect of 55 miles per hour is shown, and similarly with the presence of all three frequencies the least restrictive signal aspect is shown as being 70 miles per hour. A tabular form of the diagram of FIG. 1 is shown in FIG. 6 which shows twelve signal aspects including one spare for three code rates and three frequencies. In addition, the absence of a code rate would provide emergency braking. It is to be understood that the table of FIG. 6 is merely an illustrative example of the application of the invention and the invention is not to be limited thereby.

The master frequency $f1$ is shown in FIG. 2 as being applied at approximately equal "on-off" times in pulses, while the auxiliary frequencies $f2$ and $f3$ are shown as being fed to the track circuit in pulses which fill in the "off" time of the master frequency $f1$, to thereby create four different code patterns. Any of these code patterns can be applied at the feed or exit end of a detector section. The code pattern can be changed downward as indicated by the solid connecting lines in FIG. 1 at an intermediate control point. However, the code rate within a detector section cannot be changed once it is established by track occupancy conditions of detector sections in advance of the particular detector section. By analysis of the foregoing it can also be seen that if a fourth frequency is added, with the frequency $f1$ being present at all times, twenty-one different signal aspects may be obtained with three code rates, plus, of course, the emergency braking provision in the absence of a coded signal. Thus it can be seen that by the addition of other frequencies or code rates the number of train commands available can be readily increased in accordance with the invention.

FIG. 7 shows a typical track layout with a distance of 2640 feet between stations Y and Z. The points along the track designated as A1, A2 and A3 are the exit ends of the particular detector sections 1T, 2T and 3T, respectively, while the figures preceded by a B indicate intermediate control points commonly referred to as B-points where the auxiliary frequencies are applied to the tracks to provide additional train commands. The trains are represented by elongated blocks having an arrow at one end indicating the direction of travel, and shown in various positions designated G through O, with the corresponding signal aspects shown by a figure or character designation over an arrow to show the particular signal aspect at a given point. FIGS. 8 and 9 show additional layouts for particular track applications which may require different signaling conditions due to such factors as track length or train frequency. The illustrative dimensions shown in FIGS. 7-9 are based upon calculations in which it is assumed that the train has ten cars of sixty-seven foot length, and that the train decelerates upon braking at two and one-half miles per hour per second. The location of and distance between B-points is determined according to the distance traveled during the reaction time for the car-carried equipment to respond to a more restrictive speed control code pattern plus the distance traveled during braking plus a safety margin. This distance would depend on the maximum command speed permitted at a control point and the more restrictive command speed at the control point in advance.

FIG. 10 shows a schematic representation of the wayside circuits of the track layout shown in FIG. 7. Conventional nomenclature is used throughout FIG. 10. in which 1T, 2T and 3T represent the individual detector sections, the systems in this particular case being a two-rail return track system having insulated block sections and utilizing conventional impedance bonds. The numerals preceded by the letter A represent the exit end of a block or detector section where the master frequency $f1$ is applied across the track rails. The two-digit numerals preceded by the letter B represent the intermediate control or B points, the first digit representing the number of the block section and the second digit representing the intermediate control point with the second digit increasing from a number 1 at the intermediate control point closest the exit end. In keeping with the usual practice, the return conductor for the alternating current source is designated NX and the positive and negative terminals of the direct current source are designated BDC and NDC, respectively. The track relays are designated 1TR, 2TR and 3TR, the numeral representing the respective detector section, while the geometric blocks interposed between the track relays and the receiving end of the detector section are track units designated 1TU, 2TU and 3TU, respectively, according to the block or detector section, each track unit having an auxiliary frequency responsive coil designated $f1BX$ to restrict actuation of the track relay to the master frequency $f1$ only. The track units are tuned to respond to the master frequency present within the detector section and are phase sensitive. For the track units to have an ouput, the energy supplied to both the track and auxiliary windings must be of the same frequency, and in the proper phase sequence. As can be seen from FIG. 10, a pair of leads extends from each track unit, the leads being designated NX and $f1BX$ indicating a local source of supply of alternating current energy of the master frequency f1. The units are so designed to maintain the track relay in its energized position continuously as long as the master frequency is being received regardless of the code rate. Such track units are conventional and require no further explanation. The polarities of the local windings of the track units are reversed from one detector section to its adjacent detector section, as shown. This is done to prevent interference between adjacent track sections and to provide broken-down insulated joint protection.

The winding of each of the relays employed in my invention is shown in the drawings by a rectangle in the conventional manner and the contacts controlled by the neutral type relays employed are in most instances disposed below or above the rectangle representing the relay winding and are indicated as controlled thereby by a dotted line extending from each respective rectangle to the associated contacts. Where contacts of relays are not so disposed the relay by which each contact is controlled is identified by the reference character for the relay being placed on the drawings above each such contact or group of contacts. The upper and lower contacts of such relays shall be referred to as the front and back contacts, respectively. In accordance with the usual practice, a relay of the magnetic stick type has its winding designated as a rectangle with a block inserted in the upper right-hand corner thereof, with the contacts disposed in a vertical manner above or below its respective winding. The contacts of the magnetic stick relays are actuated to the left or to the right and such contacts shall be referred to hereinafter as normal and reverse contacts, respectively. The magnetic stick relay windings are also shown to have a polarity of plus or minus, the polarity indicating that a conventional current flow from plus to minus will actuate the contacts to their normal or left-hand position, while current flow from minus to plus will actuate the contacts to their reverse or right-hand position. Neutral type relays and magnetic stick relays are conventional types which are well known in the railway signaling art.

A plurality of code transmitter relays are employed and are designated in the drawings as CT and have a prefix designating the code rate of the relay, such as 180CT, 120CT and 75CT. Such code transmitting relays are also well known in the railway signaling art and the code rate of such a relay refers to the number of closures per minute of the front or back contacts of the relay when the winding of the relay is energized. As shown in the drawings, the windings of the code transmitter relays are continuously energized by connecting the positive and negative terminals of the batteries BDC and NDC, respectively, to the relay windings and, therefore, the contacts of each relay are continuously operating at the respective code rate of the relay. The contacts of such relays are, therefore, illustrated by dotted lines for the movable portion of the contacts against both the front and back contact points, thereby indicating that although the relays are continuously energized, the contacts are intermittently operating at the respective code rates. There are also other code responsive relays designated as CTP which is a code transmitter repeater relay, and CHR which is a code halving relay, each designation being preceded by a prefix 1, 2 or 3 indicating its association with the particular block or detector section. These code responsive relays are of the magnetic stick type, the movable portions of their contacts being shown in dotted lines indicating that they are being intermittently operated as long as their respective windings are energized. The code transmitter repeater relays CTP follow the coding action of the code transmitters CT in which circuits they are located. The code halving relays 1CHR and 3CHR are actuated by the contacts of the code transmitter repeater relays 1CTP and 3CTP, respectively, and are established in circuits, the result of which is that the relays 1CHR and 3CHR are following at one-half of the code rate of the contacts 1CTP and 3CTP, respectively. The details of this circuit can be understood by reference to the circuit containing relay 1CHR, as shown in FIG. 10.

Initially, the capacitor C1 will be fully charged and with the contact b of relay 1CTP in its left-hand or normal position the capacitor C1 will discharge through resistor R1 over normal contact b of relay 1CTP through the winding of the code halving relay 1CHR in its plus to minus direction and through capacitor C2. The capacitors C1 and C2 are direct current capacitors which are so designed that they become charged when the current flows in one direction, but permit the current to pass therethrough when it flows in the opposite direction. The contacts a and b of relay 1CHR will be actuated to their left-hand or normal position. Since relay 1CHR is a magnetic stick relay, its contacts will remain in the position to which they were last actuated until current of the polarity opposite to that which moved them there flows therethrough. During the second half of the cycle of relay 1CTP, its contact b moves to the right-hand or reverse position permitting current to flow from terminal BDC of the battery over normal contact b of relay 1CHR from plus to minus of capacitor C2, thereby charging it, from minus to plus of capacitor C1, through resistor R1, over the reverse contact b of relay 1CTP and over the normal contact a of relay 1CHR to the negative terminal NDC of the battery source. When relay 1CTP begins its second cycle and its contact b moves to its normal position, the capacitor C2 discharges through the winding of the relay 1CHR in the negative to positive direction, thereby causing the contacts a and b of relay 1CHR to be actuated to their reverse position. Then during the second half of the second cycle of the coding action of relay 1CTP, contact b is actuated to its reverse or right-hand position, whereupon capacitor C1 is charged from the positive terminal BDC of the battery, over reverse contact a of relay 1CHR, over reverse contact b of relay 1CTP, through resistor R1, through the respective capacitors to the reverse contact b of relay 1CHR to the negative terminal NDC of the battery. Thus, it can be seen that the code halving relay 1CHR goes through one complete coding cycle for every two coding cycles of the code transmittter repeater relay 1CTP, and consequently the code rate established by relay 1CHR is one-half that of the relay 1CTP.

There is also shown in FIG. 10 the "coast" relay CR and a "station pass" relay SPR which are shown to be of the neutral type, and are indicated as being computer controlled. The purposes of these relays will be discussed later as the description proceeds.

The direction of traffic flow in FIG. 10 is from left to right and during the times the detector sections are unoccupied, the track relays 1TR, 2TR and 3TR are in their energized conditions with their front contacts closed. The position of the contacts of the track relays determines the code rate at which the code transmitter repeater relays will operate.

The schematic representation shown in FIG. 10 is a portion of the track layout application of FIG. 7. An explanation thereof can be readily had by comparison of these two figures with the code pattern assignments shown in FIG. 1. During nonoccupancy of the track section shown in FIG. 10, the track relays 1TR, 2TR and 3TR are energized and with a particular computer program, "station pass" relay SPR and "coast" relay CR are deenergized. With track relay 1TR energized and coast relay CR deenergized, track detector section 2T receives code at the 180 code rate or at code rate 180 as designated in FIG. 1. The code operation can be described by referring to FIG. 10. The winding of the code transmitter relay 180CT is continuously energized from terminals BDC and NDC of the direct current source, and the relay is intermittently opening and closing its contacts. When the contacts are in the picked-up position current flows from the battery terminal BDC over the front contact a of code transmitter relay 180CT, over the front contact $a$ of track relay 1TR to the positive terminal of the code transmitter repeater 2CTP, then through its winding to its negative terminal, over the front contact $b$ of track relay 1TR, over the front contact $b$ of code transmitter relay 180CT to the negative terminal NDC of the battery. During this half cycle of the coding operation, the code transmitter repeater relay 2CTP has its contacts activated to the left-hand or normal position, whereupon the frequency $f1$ is applied from its positive terminal $f1BX$ over the normal contact $a$ of repeater relay 2CTP to the track signaling point A2. The track signaling current is shown as being applied to the primary of a transformer having one terminal designated PA2 and the other terminal, indicating the return for the alternating current, designated NX, the secondary of the transformer having a series current limiting resistor and being connected across the track rails. The transformer primary terminal points for applying the signal to a control point are designated by the designation for the control point preceded by the letter P. This method of feeding signaling current to the track rails is conventional and requires no further explanation. During the second half cycle of the code transmitter relay 180CT the current flows from the battery termnial BDC over the back contact $b$ of code transmitter relay 180CT, over the front contact $b$ of track relay 1TR to the negative terminal of the code transmitter repeater relay 2CTP, then through its winding to its positive terminal, over the front contact $a$ of track relay 1TR and over the back contact $a$ of code transmitter relay 180CT to the negative terminal NDC of the battery. The contacts of the code transmitter repeater relay 2CTP are then actuated to the right-hand or reverse position whereupon the frequency $f2$ is supplied from its positive terminal $f2BX$ over the back contact $a$ of "coast" relay CR, over the front contact $c$ of track relay 1TR, over the reverse contact $b$ of code transmitter repeater 2CTP to signal transformer terminal PB21 and then to the intermediate control point B21 connected to the track rails in detector section 2T. Thus it can be seen that frequency $f1$ will be applied at control point A2 while frequency $f2$ will be applied at control point B21, and accordingly, the induction pickup coils of the train, when the train is proceeding between control point A3 and intermediate control point B21, will receive the combined frequencies $f1$ plus $f2$, and as shown in FIG. 1, the code pattern assignment at code rate 180 for the frequencies $f1$ plus $f2$ will be fifty-five miles per hour as indicated by the rectangular block directly beneath the code pattern assignment for the code pattern of FIG. 3. Once the train passes the intermediate control point B21, its induction coils will pick up the frequency $f1$ at code rate 180 which signifies a code pattern assignment of 40 miles per hour. This is indicated diagrammatically in FIG. 7 for the train designated G.

Similarly, with track relay 3TR in its energized position the code transmitter relay 120CT is opening and closing its contacts $a$ and $b$ to reverse the polarity of energization of the code transmitter repeater relay 1CTP at the 120 code rate over the contacts $a$ and $b$ of track relay 3TR. The code transmitter repeater relay 1CTP then follows the code rate 120 of the coding transformer. During the half cycle of the code transmitter repeater relay 1CTP when the contacts are in the lefthand or normal position, the signaling frequency $f1$ is applied to the normal contact $a$ of code transmitter repeater relay 1CTP to be fed to control point A1 of detector section 1T.

With the "station pass" relay SPR in its deenergized position, the carrier frequency $f2$ would be applied to the intermediate control point B11 in detector section 1T from the positive terminal BX of the carrier frequency source over the back contact $b$ of relay SPR, over the normal contact $d$ of relay 1CHR, over the reverse contact $d$ of relay 1CTP to the signal transformer terminal PB11. With relay 1CHR transmitting at one-half the code rate of relay 1CTP, the carrier frequency $f2$ will be fed to the control point B11 during one-half of every other cycle of the relay 1CTP, as shown in FIG. 5. During the intervening half cycles when neither $f1$ nor $f2$ is being applied to the track, the carrier frequency $f3$ is being supplied from the positive terminal $f3BX$ over back contact $a$ of relay SPR, over reverse contact $c$ of relay 1CHR, over reverse contact $c$ of relay 1CTP, over front contact $d$ of relay 3TR to signal transformer terminal PB12 and consequently to the intermediate control point B12. As long as track relay 3TR is in its energized position, no signal is applied to the control point B13. Thus, as a train enters detector section 1T it receives a signal comprising the frequencies $f1$ plus $f2$ plus $f3$ until such time as the train wheels short out the intermediate control point B12. As can be seen from FIG. 1 at code rate 120 the signal aspect for the presence of all three frequencies is a speed of 40 miles per hour with a "station stop" indication designated SS. As the train passes intermediate control point B12, the signal being received is $f1$ plus $f2$, the signal aspect being a permissive speed of 25 miles per hour with a "station stop" indication. As the train proceeds past control point B11, the signal frequency $f1$ is being received at code rate 120 to indicate service braking applications designated as SB. The train-carried equipment will be discussed in detail later. The respective signal aspects for detector section 1T are shown in FIG. 7 for the train designated G.

The circuitry establishing the code rates for the code halving relays 1CHR and 3CHR is identical and is dependent upon the code rate established by code transmitter repeater relays 1CTP and 3CTP, respectively.

With track relay 2TR in its energized position, code transmitter repeater relay 3CTP is being operated at the 180 code rate in response to the energization of its winding from the contacts of relay 180CT over the front contacts $a$ and $b$ of track relay 2TR. With track relay 1TR energized and "coast" relay CR deenergized, it can be seen that the frequency $f1$ is applied to control point A3 when the contact $a$ of relay 3CTP is in its normal position and frequency $f2$ is applied to control point A3 when the contacts of relay 3CTP are in their reverse position. Frequency $f1$ is applied over normal contact $a$ of relay 3CTP while frequency $f2$ is applied from $f2BX$ over the reverse contact $c$ of relay 3CTP over the front contact $d$ of track relay 2TR, over the back contact $b$ of relay CR, over the front contact $d$ of track relay 1TR, and over the reverse contact $a$ of relay 3CTP to signal transformer terminal PA3 and thus to control point A3. Thus under these conditions the code pattern of FIG. 4 is applied at the control point A3, which corresponds to a speed of 55 miles per hour as indicated in FIG. 1 at a code rate 180 and a frequency $f1$ plus $f2$. As can be seen from FIG. 10, as long as track relays 1TR and 2TR are energized, no control signal is applied to the intermediate control point B31, B32 or B33. Additionally, it can be seen that there is an energizing circuit identical to the code halving relay 1CHR, which includes code halving relay 3CHR. The circuitry and operation are identical to that discussed in connection with relay 1CHR and further discussion thereof is deemed unnecessary.

If the computer-controlled "coast" relay CR is energized, and the "station pass" relay SPR is deenergized, the signal aspects at control point A3 and intermediate control point B21 are altered to provide a "coast" indication C, as diagrammatically illustrated in FIG. 7 with reference to the indications for train H. The effectuation of this is shown in FIG. 10 whereby upon the energization of relay CR the frequency $f3$ is applied at intermediate control point B21 during the "off" time of frequency $f1$, the circuit being from $f3BX$ over the front contact $a$ of relay CR, over the front contact $c$ of track relay 1TR, over the reverse contact $b$ of code transmitter repeater relay 2CTP. Consequently, the signal received by a train approaching intermediate control point B21 is the sum of the frequencies $f1$ plus $f3$ at code rate 180 which is the code pattern of FIG. 4, and by reference to FIG. 1 is indicated by the block beneath f1 plus f3 at code rate 180 which shows a signal aspect of "coast." Similarly, the control point A3 which is receiving code at the 180 code rate begins to transmit frequencies f1 plus f3 instead of f2, the circuit being from f3BX over the reverse contact b of relay 3CTP, over the front contact c of track relay 2TR, over the front contact b of relay CR, over the front contact d of track relay 1TR, and over the reverse contact a of relay 3CTP. The frequency f3 is applied during the "off" time of frequency f1 to give the code pattern of FIG. 4 and the corresponding "coast" indication in FIG. 1.

The train represented by the elongated block I in FIG. 7 shows the various signal aspects being transmitted when the "coast" relay CR is deenergized and the computer-controlled "station pass" relay SPR is energized. As can be seen by comparison with the train designated G, the signal aspects are altered at the control points for station Y, namely, control point A1 and intermediate control points B11 and B12. This can readily be understood by reference to FIG. 10, whereby the energization of relay SPR opens the back contact b to interrupt the circuit between frequency f2BX and intermediate control point B11, thereby transmitting no signal to this intermediate control point. Similarly, the back contact a of relay SPR is in series between the terminal f3BX and the terminal leading to the track transformer at the intermediate control point B12, and upon the energization of relay SPR the signal to intermediate control point B12 ceases. Instead the frequency f3 is applied over the front contact a of relay SPR, over the reverse contact a of code transmitter repeater relay 1CTP to signal transformer terminal PA1 and thus to control point A1. Frequency f3 is applied during the "off" cycle of frequency f1, and the signal transmitted from control point A1 is f1 plus f3 at code rate 120. This corresponds to the code pattern of FIG. 4 and at code rate 120, as shown in FIG. 1, the signal aspect is 40 miles per hour applied to control point A1.

In FIG. 7, the elongated rectangular blocks, designated J, K, L, M, and N, represent a train in various positions along the track, showing the signal aspects being transmitted to trains which may be following when the computer-controlled "coast" and "station pass" relays are deenergized. The effect which the train has on the various signal aspects in the immediately preceding section can be readily understood by reference to the analysis concerning the train designated G. The train designated O is in the same relative position as the train designated N with the only difference being that the "station pass" relay SPR is energized and the signal aspects in track section 1T are altered. The effectuation of this can be understood from the analysis concerning the train designated I and no further explanation is deemed necessary.

By referring to FIG. 10 it can be seen that relay 1CTP is not wired to provide the 180 code rate, relay 2CTP is not wired to receive the 75 code rate, and relay 3CTP is not wired to receive the 120 code rate. Accordingly, the 180 code can appear only in track section 2T or 3T, the 120 code is limited to track section 1T or 2T, and the 75 code is limited to track section 1T or 3T. This is intended to be illustrative only and there is no reason why all three code rates cannot be applied to all three code transmitter repeater relays. The schematic circuit of FIG. 10, which is diagrammatically illustrated in FIG. 7, does not require the additional signal aspects which could be obtained by employing all three code rates in all three sections.

FIG. 11 shows a modification of the wayside control circuits shown in FIG. 10 and is intended for use in the typical track application diagrammatically illustrated in FIG. 8, in which there is a greater distance between stations and only two intermediate control points in track section 3T. By comparing the trains designated L and M in FIG. 8 with the correspondingly designated trains in FIG. 1 it can be observed that less restrictive signal aspects are transmitted to trains entering section 3T and traveling toward control point A3.

By using the track wayside control circuits of FIG. 10 with the modification of FIG. 11 for track section 3T, when the train designated L is in track section 1T, the track relay 1TR will be deenergized due to the wheels of the train shunting the supply of current to the track relay. With the track relay 1TR deenergized, the code transmitter repeater relay 2CTP will be operated at the 120 code rate over the back contacts a and b of relay 1TR. Since the relay 2CTP is in the circuitry associated with the preceding track section 2T, the signaling currents transmitted to control points A2 and B21 will be altered, the signal to A2 being from f1BX over the normal contact a of relay 2CTP to control point A2, and the signal to B21 being from f3BX over the back contact c of track relay 1TR, over the reverse contact b of relay 2CTP to intermediate control point B21, both at the 120 code rate. As can be seen, the frequencies f1 and f3 will be applied alternately. The signal aspect at intermediate control point B21 will be f1 plus f3 at the 120 code rate or code rate 120 as designated in FIG. 1, and by reference to FIG. 1 it is seen to be a signal speed of 40 miles per hour. Similarly, control point A2 transmits a frequency of f1 at code rate 120 for a signal aspect of service braking. With "coast" relay CR and track relay 1TR deenergized, the signal applied to control point A3 will be from f1BX over the normal contact a of relay 3CTP to control point A3 at the 180 code rate, and during the "off" portion of frequency f1, frequency f2 will be applied from f2BX over the back contact d of relay 1TR, over the back contact b of relay CR, over the front contact e of relay 2TR, over the reverse contact a of relay 3CTP to control point A3. This will give a signal of f1 plus f2 at the 180 code rate which, as shown in FIG. 1, indicates a signal aspect of 55 miles per hour applied at control point A3. During this time no signal is applied to control points B33 and B31 which are in series circuits with the back contacts c and d, respectively, of track relay 2TR which is in its energized condition.

When a train is in the position indicated as M, track relay 3TR is deenergized due to the occupancy of train M in track section 3T. Thus it can be seen in FIG. 10 with the deenergization of track relay 3TR, the code transmitter repeater relay 1CTP is operating at the 75 code rate over the back contacts a and b of relay 3TR. This will effect a code rate change in the immediately preceding track section 1T. The signal aspects in track section 1T and track section 2T of FIG. 8 will be identical to those illustrated for train M in FIG. 7. In the track section 3T of FIG. 8 it can be seen from FIG. 11 that the frequency f1 will be applied from f1BX over the normal contact a of relay 3CTP to control point A3 at the 180 code rate, and frequencies f2 and f3 will be alternately applied during the "off" cycle of frequency f1 due to the one-half code rate of relay 3CHR. Frequency f3 will be applied from f3BX over the reverse contact c of relay 3CHR, over the reverse contact b of relay 3TCP, over the front contact c of relay 2TR, over the front contact d of relay 1TR, over the back contact b of relay CR, over the front contact e of relay 2TR, over the reverse contact a of relay 3CTP to control point A3. Also, f2 will be applied from f2BX over the normal contact d of relay 3CHR, over the reverse contact c of relay 3CTP, over the front contact d of relay 2TR, over the front contact d of relay 1TR, over the back contact b of relay CR, over the front contact e of relay 2TR, over the reverse contact a of relay 3CTP to control point A3. Consequently, the signal aspect to control point A3 is f1 plus f2 plus f3 at the 180 code rate which, as can be seen in FIG. 1, is an indicated speed of 70 miles per hour. No signal is applied at intermediate control points B33 and B31.

FIG. 12 shows a modification of the wayside control circuits of FIG. 10 to be utilized in the application shown in FIG. 9 where an additional track section A3T is interposed between track sections 2T and 3T. FIG. 9 would be illustrative of a track application having a very large distance between stations. The trains designated K, L and M are shown in track sections 2T, 1T and 3T, respectively, and the corresponding signal aspects at each control point are indicated for each train position. FIG. 12 only shows a portion of the wayside control circuits wherein there is a deviation from the circuit shown in FIG. 10. For example, an additional code transmitter repeater relay is necessary due to the additional track circuit A3T and the relay is designated A3CTP, the relay being controlled by means of the adjacent track section relay 2TR. Similarly, code transmitter repeater relay 3TCP is controlled over its adjacent track relay A3TR. The circuits for actuating the code halving relays 2CHR and A3CHR are not shown since they are identical to the circuit containing relay 1CHR which has been fully explained and no further discussion thereof is deemed necessary. There is also indicated a track relay A3TR which is identical in operation and function to the previously discussed track relays 1TR, 2TR and 3TR. The track relay A3TR is connected to the entrance end of track section A3T with a tuned unit interposed therebetween so that said track relay is responsive only to the primary frequency $f1$. The connection of the tuned unit is identical to those employed with the other track relays shown in FIG. 10.

In FIG. 9, with a train in track section 2T, as represented by train K, track relay 2TR is deenergized due to the shunting by the wheels of the train of the frequency $f1$ applied at the control point A2. As shown in FIG. 12, with track relay 2TR deenergized the relay A3CTP is operating at the 120 code rate over the back contacts $a$ and $b$ of relay 2TR. Consequently, at the control point AA3 the frequency $f1$ would be applied from $f1BX$ over the normal contact $a$ of relay A3CTP to control point AA3, and with relay 2TR deenergized the frequency $f3$ would be applied during the "off" cycle of frequency $f1$ from $f3BX$ over the back contact $d$ of relay 2TR, over the reverse contact $b$ of relay A3CTP to control point AB31. Thus the signal aspect at control point AA3 would be the frequency $f1$ at the 120 code rate which, as can be seen in FIG. 1, would call for "service braking" designated as SB. With the frequency $f3$ applied at intermediate control point AB31, the signal aspect would correspond to the frequency $f1$ plus $f3$ at the 120 code rate which, as can be seen in FIG. 1, would indicate a speed of 40 miles per hour. With the train in the position shown by train L in track section 1T, the track relay 1TR would be deenergized. In track section 2T the frequency $f1$ will be applied from $f1BX$ over the normal contact $a$ of relay 2CTP to control point A2, and during the "off" cycle of frequency $f1$, the frequency $f3$ will be applied from $f3BX$ over the back contact $c$ of relay 1TR, over the reverse contact $b$ of relay 2CTP to intermediate control point B21. No control signal will be applied at control point B22 due to the interruption of the circuit by the deenergization of track relay 1TR. Consequently, the frequencies $f1$ and $f3$ will be applied at the 120 code rate, the signal aspect at control point A2 being frequency $f1$ at the 120 code rate which corresponds to a "service braking" application SB, as shown in FIG. 1. The intermediate control point B21 will give a signal aspect of $f1$ plus $f3$ at the 120 code rate which indicates a speed of 40 miles per hour. In track section A3T the frequency $f1$ will be applied at the 180 code rate from $f1BX$ over the normal contact $a$ of relay A3CTP to control point AA3, and the frequencies $f2$ and $f3$ will be applied during alternate "off" cycles of frequency $f1$. The frequency $f2$ will be applied from $f2BX$ over the normal contact $c$ of relay A3CHR, over the back contact $d$ of relay CR, over the front contact $c$ of relay 2TR, over the reverse contact $a$ of relay A3CTP to control point AA3. The frequency $f3$ will be applied from $f3BX$ over the reverse contact $c$ of relay A3CHR, over the back contact $d$ of relay CR, over the front contact $c$ of relay 2TR, over the reverse contact $a$ of relay A3CTP to control point AA3. Consequently, the frequencies $f1$ plus $f2$ plus $f3$ are applied to control point AA3 at the 180 code rate to give a signal aspect of 70 miles per hour, as shown in FIG. 1.

In FIG. 9, with a train in track section 3T, as represented by train M, the track relay 3TR will be deenergized and relay 1CTP will be operated at the 75 code rate over the back contacts $a$ and $b$ of track relay 3TR. By referring to the portion of the circuit in FIG. 10 for track section 1T, it will be seen that the frequency $f1$ is applied from $f1BX$ over the normal contact $a$ of relay 1CTP to control point A1 at the 75 code rate. The frequency $f2$ is applied from $f2BX$ over the back contact $b$ of relay SPR, over the normal contact $d$ of relay 1CHR, over the reverse contact $d$ of relay 1CTP to intermediate control point B11, and $f3$ is applied from $f3BX$ over the back contact $a$ of relay SPR, over the reverse contact $c$ of relay 1CHR, over the reverse contact $c$ of relay 1CTP, over the back contact $d$ of relay 3TR to intermediate control point B13, both at the 75 code rate. The signal aspect at control point A1 is the frequency $f1$ at the 75 code rate which is a "service braking" application SB, as shown in FIG. 1. Similarly, the signal aspect at intermediate control point B13 is $f1$ plus $f2$ at the 75 code rate which shows a speed of 10 miles per hour, and intermediate control point B11 has a signal aspect of $f1$ plus $f2$ plus $f3$ at the 75 code rate to show a permissive speed of 25 miles per hour. In track section 2T, the code transmitter reepater relay 2CTP is operating at the 180 code rate over the front contacts $a$ and $b$ of track relay 1TR (see FIG. 12). The frequency $f1$ is applied from $f1BX$ over the normal contact $a$ of relay 2CTP to control point A2. During one "off" cycle of frequency $f1$ the frequency $f2$ is applied from $f2BX$ over the normal contact $c$ of relay 2CHR, over the back contact $b$ of relay CR, over the front contact $c$ of relay 1TR, over the reverse contact $b$ of relay 2CTP to intermediate control point B21, and during the alternate "off" cycles the frequency $f3$ is applied from $f3BX$ over the reverse contact $d$ of relay 2CHR, over the back contact $c$ of relay CR, over the front contact $d$ of relay 1TR, over the reverse contact $c$ of relay 2CTP to the intermediate control point B22. By referring to FIG. 1, this would show, for a 180 code rate, a signal aspect of 40 miles per hour at control point A2, a signal aspect of 55 miles per hour at intermediate control point B21, and a signal aspect of 70 miles per hour at intermediate control point B22. In the track section A3T the signal operation would be at the 180 code rate since the code transmitter repeater relay A3CTP is being operated at that rate over the front contacts $a$ and $b$ of track relay 2TR. The frequency $f1$ would be applied over the normal contact $a$ of relay A3CTP to control point AA3, while the frequencies $f2$ and $f3$ would be applied during alternate "off" cycles of the frequency $f1$. The frequency $f2$ would be applied from $f2BX$ over the normal contact $c$ of relay A3CHR, over the back contact $d$ of relay CR, over the front contact $c$ of relay 2TR, over the reverse contact $a$ of relay A3CTP to control point AA3, while the frequency $f3$ would be applied from $f3BX$ over the reverse contact $c$ of relay A3CHR, over the back contact $d$ of relay CR, over the front contact $c$ of relay 2TR, over the reverse contact $a$ of relay A3CTP to the control point AA3. The frequency $f1$ plus $f2$ plus $f3$ at the 180 code rate shows a signal aspect of 70 miles per hour at control point AA3.

Shown in FIG. 13 is the train-carried equipment for controlling the train in response to the signals transmitted from the track circuits of FIGS. 10, 11 and 12. Two pickup coils or receivers RC1 and RC2, having their windings in series aiding relationship, are located in inductive relationship with the track rails and are positioned in advance of the front wheels of the locomotive. The receivers RC1 and RC2 are connected in series with a capacitor C5 to provide a tuned pickup circuit of sufficient bandwidth to pick up the master frequency and all auxiliary frequencies employed for signaling purposes. An amplifier having an input transformer is provided for each of the frequencies $f1$, $f2$ and $f3$, the primaries of the input transformers being connected in series with each other and with the incoming signal circuit RC1–RC2–C5. As an alternative, the amplifiers may be connected in parallel with the incoming signal circuit, and the input to the amplifier need not be limited to the transformer input shown. Each amplifier is tuned to be responsive, and to amplify, that particular frequency. Each amplifier receives its power from a direct current source having its terminals designated BDC and NDC, and the output of each amplifier is coupled to its own respective frequency responsive decoding unit CDU, each of which in turn supplies the power to the windings of the control relays L1, L2 and L3. In parallel with the output of the master frequency responsive amplifier F1 are two code responsive decoding units selectively tuned to a code rate, the unit 180DU being responsive to code rate 180, and the unit 120DU being responsive to code rate 120 for frequency $f1$. Each of these selective decoding units provides the power to the winding of an associated control relay Q and W, respectively. As discussed previously, the master frequency $f1$ must be present at all times to insure proper performance of this system. The decoding unit 1CDU responds to the presence of the frequency $f1$ regardless of the code pattern or code rate, and consequently a code responsive decoding unit for the 75 code rate is not necessary. With the presence of frequency $f1$ the control relay L1 is energized and a circuit is completed from the positive terminal BDC of the direct current source over the front contact $a$ of relay L1 through the winding of the emergency brake valve to the negative terminal NDC. As long as the emergency brake valve winding is energized the emergency brakes are not applied. Consequently, should a train enter a block section occupied by another train, or should there be a broken rail within a block section, the control relay L1 would be deenergized to cut off the power to the emergency brake valve winding and actuate the emergency brake. The control relay L1 acts as an "on-off" switch for the entire train-carried system and it must be energized for the train to respond to any signal aspect, thus assuring a fail-safe system.

As shown in FIG. 13, the receivers RC1 and RC2 are picking up a signal consisting of $f1$ plus $f2$ plus $f3$ at the 180 code rate, thus energizing control relays L1, Q, L2 and L3. Each frequency responsive amplifier and its associated decoding unit CDU is so designed to maintain its respective relay winding in the energized condition as long as the frequency to which it is responsive is being received, regardless of the code rate or code pattern. For speed indications, there is a governor-controlled speed indicator GOV enclosed in dotted lines, and is of the type having a plurality of contacts, each contact being actuated to its open position upon the speed of the train exceeding the speed indication for a given contact. The details of the governor are not shown inasmuch as it forms no part of the present invention and is of a type which is well known in the art.

In this system there is also provided a station-stop-servo control (not shown) which ordinarily controls the train entering a station to bring the train to a smooth comfortable stop at a precise spot in accordance with a computer command. The servo control is actuated by energy from a wayside coil or loop as the train approaches the station and takes over at a suitable time to comfortably stop the train at a desired location provided traffic conditions permit. In case the servo control does not function properly the speed control will bring the train safely to a stop, but somewhat beyond the specific desired location. Distinctive speed control code patterns are used in conjunction with the station stop so correlation with the servo control is readily attainable. Since it is desirable to restrict the speed entering a station, it is not necessary to actuate the servo control very far into the station. Automatic opening of the car doors is accomplished by actuation by a wayside coil or loop in conjunction with the speed control car-carried equipment indicating that the proper code pattern is being received and that the train is stopped or nearly so. Doors are automatically closed when the computer commands the wayside speed control equipment to provide a "proceed" code pattern. At the end of a run, reversal of train movement is actuated by a wayside coil in conjunction with speed control equipment.

The wayside coils or loops used to actuate the station-stop-servo control are of the conventional type and are well known in the art. The windings of the train-carried station-stop-servo relays are not shown in the drawings but the contacts thereof are designated by suitable reference characters identified in the table and shown in the circuits of FIG. 13. These station-stop-servo relay contacts are shown in their deenergized condition and are actuated only upon the train entering a track section in the vicinity of the station whereupon the station-stop-servo control assumes command and actuates the relays according to a programmed sequence.

In the train-carried equipment of FIG. 13, when the power application valve is energized, power is being applied, and when the service brake valve and emergency brake valve are energized the brakes are in their released position. The speed indicator or governor GOV is shown as having all its contacts in their closed position indicating that the train is not moving, and as the train progresses in speed the contacts open at the designated speed for that contact and remain open until the train speed falls below that particular setting. With the receivers RC1 and RC2 picking up a signal from the tracks consisting of $f1$ plus $f2$ plus $f3$ at the 180 code rate, the train-carried equipment receives a code corresponding to a signal aspect of 70 miles per hour, and a circuit is completed from the battery terminal BDC over the front contact $a$ of relay L1, over the front contact $b$ of relay Q, over the front contact $a$ of relay L2, over the front contact $b$ of relay L3, over the contact 70 of the speed indicator GOV, over the front contact $a$ of relay SDC, through the winding of the service brake valve to the battery terminal NDC. A second circuit is also established from the battery terminal BDC over the front contact $a$ of relay L1, over the front contact $c$ of relay Q, over the front contact $d$ of relay L2, over the front contact $g$ of relay L3, over the contact 65 of the speed indicator, over contact $b$ of relay SDC, through the relay winding of the power application valve to negative terminal NDC of the battery. By referring to FIG. 6 it will be seen that for a given code rate and pattern there is a maximum and minimum speed indicated for each signal aspect, and for the signal being applied to the circuit in FIG. 13 this would indicate a maximum speed of 70 miles per hour and a minimum speed of 65 miles per hour. Thus, for each signal aspect received by the train-carried equipment two circuits are completed, one circuit containing the governor contact for the maximum speed, this contact being in series with the energizing winding of the service brake valve, and the other circuit including the contact for the minimum speed for a particular speed setting, this contact being in series with the energizing winding of the power application valve. Thus, as the train proceeds in response to the signal from a standstill, the contacts of the speed indicator will progressively open in sequence from 0 miles per hour until the locomotive reaches the minimum for a particular signal aspect, and as the train speed exceeds the minimum setting the contacts will open and interrupt the energizing circuit for the power application valve to stop the motive power to the train. Should the train exceed the maximum speed setting for a given signal aspect, that contact will open and thereby interrupt the energizing circuit for the service brake valve, thereby causing a service application of the brakes to slow the vehicle down to a point below that maximum setting, at which time that contact will again close to reenergize the winding for the service brake valve and release the brakes. For the 70 mile per hour speed aspect illustrated, as the train is moving at a speed below 65 miles per hour, the motive power is "on" and the service brake valve is energized so that the brakes are "off," and as the train exceeds 65 miles per hour, contact 65 of the speed indicator GOV is opened to interrupt the flow of power and permits the train to coast between 65 and 70 miles per hour. At speeds above 70 miles per hour, contact 70 of the speed indicator GOV will open to deenergize the service brake valve and cause an application of the brakes to slow the vehicle down. At speeds below 65 miles per hour, contact 65 of the speed indicator will again close to thereby initiate the application of power. Thus it can be seen for any combination of frequencies $f1$, $f2$ and $f3$ at any given code rate, the corresponding relays will be energized. Two distinct circuits will be completed, one corresponding to the maximum setting for a given speed signal aspect to energize the service brake valve, and the other for the minimum setting for that signal aspect to energize the power application valve. The circuits for the other signal speed aspects can be traced in a like manner.

The station-stop-servo control includes a programmed sequence of power application and brake application alternately to bring the train to a smooth comfortable stop at a specific location. This programmed deceleration pattern will generally be provided by train-carried equipment, the operation of which is initiated by a wayside loop or coil.

As shown in FIG. 13, the train must be receiving signals at either the 75 code rate or the 120 code rate in order to energize the portions of the circuit in which the station-stop-servo relays are located, and accordingly only these two code rates are employed in a track detector section adjacent a station. The wayside coil or loop which initiates the train-carried program to energize the station-stop-servo relays is located either at the beginning of track section 1T or in the adjacent detector section preceding track section 1T, and with the train-carried-servo control operating, the servo check relay SC is energized to pick up its contacts, and remains energized during the operation of the servo control. By referring to the train designated G in FIG. 7, and the track circuitry of FIG. 10, it can be seen that control point A1 is receiving the frequency $f1$ at the 120 code rate, that intermediate control point B11 is receiving the frequency $f2$ during every other "off" cycle of the frequency $f1$, but intermediate control point B12 is receiving frequency $f3$ during the intervening "off" cycles. These frequencies correspond to a signal aspect of 40 miles per hour at intermediate control point B12, 25 miles per hour at intermediate control point B11, and service braking SB at control point A1, track section 1T being designated for station-stop (SS). The station-stop designation indicates that the operation of the servo control will be initiated when the train is a certain distance from the station by a wayside loop or a similar triggering device, so the servo control will be in command as the train enters track section 1T. Thus, as the train enters track section 1T, the receivers RC1 and RC2 are picking up the frequencies $f1$ plus $f2$ plus $f3$ at the 120 code rate from control point A2 to intermediate control point B12. With the servo check relay SC energized, and the servo brake relay SBR deenergized, a circuit will be completed from the battery terminal BDC over the front contact $a$ of relay L1, over the back contact $b$ of relay Q, over the front contact $a$ of relay W, over the front contact $b$ of relay L2, over the front contact $e$ of relay L3, over the front contact $a$ of relay SC, over the back contact $a$ of relay SBR, over contact 40 of the speed indicator GOV, over the front contact $a$ of relay SDC, through the winding of the service brake valve to the negative terminal NDC of the battery. Similarly, the analogous circuit to the power application valve will be energized, and with the servo power relay SP energized the circuit will include positive terminal BDC of the battery, over front contact $a$ of relay L1, over back contact $c$ of relay Q, over front contact $b$ of relay W, over front contact $e$ of relay L2, over front contact $i$ of relay L3, over front contact $c$ of relay SC, over front contact $a$ of relay SP, over contact 35 of the speed indicator GOV, over front contact $b$ of relay SDC, through the winding of the power application valve to negative terminal NDC of the battery.

As the front wheels of the train pass over intermediate control point B12 the receivers on the train will no longer pick up frequency $f3$ and, accordingly, relay L3 will be deenergized to shift the train-carried equipment from the 40 mile per hour governor contact to the 25 mile per hour governor contact, and similarly in the power application circuit from the 35 mile per hour governor contact to the 20 mile per hour governor contact. As the train traverses the servo controlled distance, the servo brake relay SBR and the servo power relay SP are applied and interrupted according to the programmed deceleration pattern to bring the train to a smooth halt at the desired location. As the train proceeds beyond intermediate control point B11, the receivers RC1 and RC2 no longer pick up frequency $f2$ and, accordingly, relay L2 is deenergized and the circuits for the service brake valve winding and the power application valve winding are deenergized to effect the application of the service brakes. Once the train comes to a complete stop, the contact O of the speed indicator closes and a circuit is completed from the positive terminal BDC of the battery over front contact $a$ of relay L1, over back contact $a$ of relay Q, over back contact $a$ of relay L3, over contact O of the speed indicator to permit the contacts of the relays SDL and SDR to be utilized for operation of the doors. The relays SDL and SDR are energized by the computer program, and similarly the reverse control relay RCR cannot be actuated until the train has come to a stop. This circuit insures safe operation of the doors inasmuch as the door controls and the reverse control cannot be operated unless the train is stopped. Once the doors of the train are opened, the "doors-closed-check" relay SDC is deenergized to interrupt the circuits for the service brake valve winding and the power application valve winding. The doors must be closed to reenergize the winding of relay SDC and consequently if the doors are not closed, the train cannot move.

If the station-stop-servo control is not functioning properly, the servo check relay SC will not be energized and without altering the code rate or code pattern the 40 mile per hour signal aspect of the circuit will be diverted over the back contact $a$ of relay SC, over the back contact $b$ of relay SB, over contact 25 of the speed indicator to energize the service brake valve, and similarly the power application valve circuit will be diverted to the 20 mile per hour minimum setting. In the case of the 25 mile per hour signal aspect the next lower speed setting of 10 miles per hour will be energized. Thus, if the station-stop-servo control is not functioning properly, the speed control will take over as indicated by dotted lines in FIGS. 1 and 6 to bring the train to a halt. The B-points in the station location are so positioned as not to interfere with the station-stop-servo control. The servo speed commands are generally lower than the corresponding B-point speed commands and the car-carried equipment is so designed that the lower speed command takes priority. Accordingly, with the servo control functioning properly the train will stop within a shorter distance within the confines of the station platform at a precise location.

Another application of the concept of the present invention is shown in FIG. 14 for controlling the curve speed. The track shown is of the insulated block section type with an indicated signal aspect of 40 miles per hour at control point A2 and a 70 mile per hour signal aspect at intermediate control point B2. These signal aspects can be effectively controlled from the wayside control circuits as previously described. However, with the presence of a curve located partly in each adjacent track section 1T and 2T, it is desirable to have a maximum permissible speed for the operation of the train through the curve, and still permit the train to assume the maximum permissible speed in track section 1T after the train clears the curve. In order to accomplish this the intermediate control point B2 is established by the maximum braking distance from 70 miles per hour to 40 miles per hour so that the train enters the curve at the maximum permissible speed of 40 miles per hour. With the train traveling from left to right, as indicated in FIG. 14, a transmitter TRAN is positioned at a point adjacent the entrance end of the track section 1T and a receiver REC is positioned at the end of the curve control section. The transmitter TRAN and the receiver REC are shown as being in the audio frequency range. This is intended for illustrative purposes only, the only requirement being that the frequency of the transmitter TRAN and the receiver REC be different from that frequency employed in track section 1T so that the operation of the receiver REC is not affected by the signaling frequencies normally employed. The output of the receiver REC is connected to, and controls, a track relay AFO–TR, which, dependent on its state of energization, will permit one of two signal aspects at control point A1. With the track relay AFO–TR in its energized condition, the control point A1 will receive a signal aspect indicative of the occupancy of the detector section ahead which, as illustrated in this particular instance, is 70 miles per hour. Thus the signal aspect over the front contact of relay AFO–TR is controlled in the manner previously described with reference to FIG. 10. With the track relay AFO–TR deenergized, a signal aspect of 40 miles per hour corresponding to the maximum permissible curve speed is applied over the back contact of track relay AFO–TR at the control point A1. As shown in FIG. 14, with the train entering track section 1T, the train wheels would short out the signal from the transmitter TRAN, thereby causing track relay AFO–TR to be deenergized and thus permit the signal aspect of 40 miles per hour to be applied over the back contact of track relay AFO–TR to control point A1. As the tail end of the train passes over the location of the receiver REC, the track relay AFO–TR is then energized to permit the application to control point A1 of the signal aspect indicative of the occupancy of the detector section ahead, which in this case would be a signal aspect of 70 miles per hour applied over the front contact of track relay AFO–TR to control point A1. In the event that track occupancy conditions in the section in advance of section 1T result in a signal more restrictive than the speed limit of the curve, the track occupancy signal would prevail to control the train in section 1T according to the more restrictive signal. This could be accomplished by providing means which would not permit the track relay AFO–TR to drop away in the event of a speed signal over the front contact thereof of less than 40 miles per hour, or the signal aspect in the event it is more restrictive than the curve speed limit, could be applied over the back contact of relay AFO–TR as well as the front contact. Similarly, other methods could be employed. Thus, it can be seen that the concept of the present invention lends itself readily to provide restrictive speed zones to permit existing track systems to employ higher speeds of travel, and in addition the speed zone control signal would not be controlling in the event of a more restrictive signal due to track occupancy conditions.

FIGS. 15 through 17 show alternate detector section arrangements using AFO (audio frequency oscillator) circuits which can be employed in continuously welded two-rail return track circuits. The limits of the detector sections are defined by suitable track bonds TB which electrically connect one track rail with the other and are sufficiently large in cross section to carry the maximum amount of direct current which may result in electric propulsion territory due to an unbalance between the track rails. The track bonds TB determine the location of the control points A1, A2 and A3. Each detector section has a receiver REC located adjacent the entrance end of the detector section and a transmitter TRAN located adjacent the exit end of the detector section. The transmitter TRAN and the receiver REC are diagrammatic representations, and can employ the apparatus shown in FIG. 10 or similar apparatus. The frequencies of transmission are designated as $f1a$, $f1b$ and $f1c$. Each of these frequencies is the master frequency for its particular detector section, and for purposes of analysis these frequencies can be treated as the one master frequency $f1$ shown and described previously. Due to the lack of insulated joints in the track circuit of FIG. 15 it is apparent that some provision must be made to provide a cutoff point for the signal currents in adjacent detector sections. This is accomplished by utilizing different frequencies in adjacent sections with suitable band pass filters on the car-carried equipment to detect the various frequencies. For example, the frequency $f1a$ could be 1000 cycles per second, the frequency $f1b$ could be 1500 cycles per second, and the frequency $f1c$ could be 2000 cycles per second, thereby utilizing a frequency variance of 500 cycles per second between adjacent detector sections. Similarly, intermediate control points can be utilized in the track circuit of FIG. 15 and would operate in a manner similar to that shown and described in connection with FIG. 10. The intermediate control frequencies would be $f2$ and $f3$ and would be applied to the intermediate control points or B-points according to the speed limits to be imposed within the detector section. The receivers REC are tuned to respond to the master frequency present in its respective detector section. The receivers REC would correspond to the track units 1TU, etc., and the track relays 1TR, etc. of FIG. 10, which upon deenergization change the code rate in at least the next preceding detector section to indicate track occupancy. In the detector section arrangements of FIGS. 15 through 17, different master frequencies must be employed in adjacent detector sections. However, the same frequency may be employed in nonadjacent circuits which must be separated by the braking distance of the train at the maximum speed authorized. The master and auxiliary frequencies are coded and can have different code rates and patterns as discussed previously for the track circuit of FIG. 10. If track layout conditions require it, the corresponding frequencies employed in adjacent trackways may differ from $f1a$, $f1b$ and $f1c$ by a variance of 100 cycles per second, for example. This is to insure against adjacent trackways emitting false signals due to the possibility of a track rail inductively picking up the signaling frequency from the track rail of an adjacent trackway.

In order to optimize the transmission power requirements of the transmitter TRAN the leads from the transmitter TRAN are elcrically connected to the track rails (FIGS. 15 and 16) at a distance from the track bond TB, this distance being indicated as 30 feet. Similarly, the leads from the receiver REC are electrically connected to the track rails at a distance indicated as 30 feet from the track bond TB to provide sufficient attenuation effect to minimize interference between adjacent detector sections. However, speed control continuity must be provided and this is accomplished by extending the leads of the transmitter TRAN from the point of electrical connection to the tracks and running the leads parallel and adjacent to the tracks to a point adjacent the track bond TB. The disposition of the leads provides three sides of a loop which is closed as the front wheels of the train pass over the electrical connecting points of the leads of the transmitter TRAN. The train coils then pick up a signal inductively from the loop until the train passes the track bond TB. As the train passes the track bond TB the train coils then pick up the master and auxiliary frequencies from the next detector section to provide continuous speed control. In FIG. 15 there is shown a small overlap section of track of about 30 feet between the track bond TB and the point of electrical connection of receiver REC. The impedance of the track bond TB and the impedance of the rails of the overlap section are so proportioned and the track circuit is so adjusted that an approaching train will not cause deenergization of the track relay associated with receiver REC until the front axle of the train passes the track bond TB, so that premature release of the track relay of receiver REC will not change the speed control signal for the train approaching the track bond TB.

FIG. 16 shows a modification of the system of FIG. 15 utilizing an arrangement to check the integrity of the bond. The AFO transmitter is connected to the track rails in the same manner as FIG. 15. However, the receiving means include a toroidal core TC encompassing the track bond TB, with a secondary winding S on the core TC. The track bond TB then acts as a primary of a transformer to induce current in the secondary S which supplies the AFO receiver REC, which in turn energizes the track relay TR. If the bond TB is broken, the receiver REC will not be picking up the signaling current and consequently the track relay TR will be deenergized to thus indicate a fault in the circuit. The toroidal core TC is shown as being formed from a pair of semi-annular core members in faced abutting relationship with suitable air gaps AG at the junctions to protect against a direct current unbalance in the propulsion power.

The track circuit shown in FIG. 17 is similar to that shown in FIGS. 15 and 16 for a continuously welded two-rail return track circuit. The track circuit of FIG. 17 however utilizes a combination impedance bond and signaling device which is more fully described in the copending application for Letters Patent of the United States, Ser. No. 382,551, filed July 14, 1964 by Ralph Popp, for Electric Induction Apparatus, now Patent No. 3,268,843, issued August 23, 1966 and which is assigned to the assignee of the instant application. The combination impedance bond and signaling device is a signal translation device STD and can be used for either transmitting or receiving. As shown in FIG. 17, the signal translating device STD has a two-turn center tapped primary winding P and a multi-turn secondary winding S. Two signaling translating devices STD are used at each junction of adjacent detector sections, one for transmitting in one detector section and the other for receiving the signal from the adjacent detector section. The center taps at each junction are tied together and electrically connected to similar center taps at junctions on adjacent trackways for cross-bonding to balance the propulsion return current. At points adjacent a power substation, several center taps of adjacent trackways can be tied together to form a neutral propulsion common return PCR, which is run directly to the power substation. Each control point A1, A2 and A3 in the detector sections has a transmitter TRAN coupled to the secondary S of the signal translating device STD to apply the signal to the control point. Each transmitter TRAN has a capacitor C6 in parallel with its output to reduce the power required from the transmitter TRAN by tuning out the reactance of the overlap section of track rail between the transmitting and receiving signal translation devices STD at each junction. The other end of the detector section is defined by the receiver locations R1, R2 and R3 at which a receiver REC tuned to the transmission frequency of the transmitter TRAN of the respective detector section is coupled to the secondary S of the signal translating device STD. Each receiver REC, depending on its energized condition, controls the code rate in at least the next preceding detector section, as described in connection with FIG. 10. Intermediate control points are also provided as illustrated in track detector section 3T where the auxiliary frequency $f2$ is applied to an intermediate control point B31 through a transformer, the secondary of which is directly connected to the track. The master frequency applied at the control points A1, A2 and A3 is separated by a fixed amount, as discussed in connection with FIG. 15, in order to prevent interference between adjacent track detector sections. Similarly, suitable band pass filters are located on the car-carried equipment. As previously mentioned, the signal translating device STD impedance and the overlap section impedance are so proportioned and the track circuit is so adjusted that an approaching train will not deenergize the track relay associated with the receiver REC at R3, for example, until the front axle passes control point A1, so that premature release of the track relay at R3 will not change the speed control signal for the train approaching the transmitter TRAN at control point A1.

Having described preferred embodiments of my invention it is desired that the invention be not limited to these specific constructions inasmuch as it is apparent that many additional modifications may be made without departing from the broad spirit and scope of my invention.

Having thus described my invention, what I claim is:

1. A train speed control system for a track divided into a plurality of sections, said system comprising:
   (a) means for supplying a coded energy signal of a first frequency to the track rails adjacent the exit end of one of said sections;
   (b) means for supplying a coded energy signal of at least one other frequency to the track rails at a point within said one section;
   (c) receiving means adjacent the entrance end of said one section and controlled by the signal energy of said first frequency, said receiving means actuating other means for altering the supply of coded energy in at least the section next in the rear; said means for supplying said coded energy of said other frequency to said track rails being positioned between said means for supplying said coded energy signal of said first frequency and said receiving means, and
   (d) train-carried means having a detector and being responsive to the received coded energy to control the speed of a train.

2. A train speed control system for a track divided into a plurality of sections, said system comprising:
   (a) means for supplying coded energy of a first frequency of the track rails at the exit end of one of said sections;
   (b) means for supplying coded energy of at least one other frequency to the track rails at a point within said one section;
   (c) receiving means for said one section controlled by the coded energy of said first frequency, said receiving means actuating other means for altering the supply of coded energy in at least the next section in the rear; and
   (d) train-carried means receiving coded energy from the track rails in advance of the train to selectively control the speed of said train according to the number of frequencies of coded energy received by said train-carried means.

3. A train speed control system for a track divided into a plurality of sections, said system comprising:
   (a) means for supplying a coded energy signal of a first frequency to the track rails at the exit end of one of said sections;
   (b) means for supplying a coded energy signal of at least one other frequency to the track rails at a point intermediate the entrance end and the exit end of said one section;
   (c) receiving means at the entrance end of said one section energized by the coded energy of said first frequency, said receiving means upon deenergization actuating other means for altering the supply of coded energy in at least the next section in the rear; and (d) train-carried means for detecting the presence of the frequencies of said coded energy signal in advance of the train to control the train in response to the presence of said frequencies.

4. A train speed control system for a railway track having the tracks divided into a series of sections, said system comprising:

(a) means for supplying a coded energy signal of a first frequency to the track rails adjacent the exit end of one of said sections;

(b) means for supplying a coded energy signal of at least one other frequency to the track rails at a point within said one section;

(c) train-carried means receiving said coded energy signals of different frequencies from said track rails in advance of the train to selectively control the speed of said train according to the combination of frequencies of coded energy signals received by the train-carried means.

5. A train speed control system for a railway track having the tracks divided into a series of sections having one or more control points within each section, said system comprising:

(a) means for supplying coded energy of a first frequency to the track rails at a first control point adjacent the exit end of a section, (b) means for supplying coded energy of a second frequency to the track rails at a second control point intermediate the entrance end and exit end of said section, and (c) train-carried means having a detector to detect the pressure of the coded energy of said first and second frequencies in advance of said detector and having units selectively responsive to the coded energy of each of said frequencies, said units controlling the train speed according to the number of frequencies detected by said detector, the smaller the number, the more restrictive the speed control.

6. A train speed control system for a track divided into a plurality of sections, said system comprising:

(a) means for supplying coded energy of a first frequency to the track rails at the exit end of one of said sections;

(b) means for supplying coded energy of a second frequency to the track rails at a point within said section intermediate the entrance and exit ends thereof;

(c) means for supplying coded energy of a third frequency to the track rails at a point between the entrance end of said section and the track location point of the energy of said second frequency;

(d) receiving means at the entrance end of said section controlled by the energy of said first frequency, said receiving means actuating other means for altering the supply of coded energy in at least the next section in the rear; and (e) train-carried apparatus having pickup coils and selective frequency responsive units, the pickup coils positioned in inductive relationship with the track rails in advance of the front wheels of a train to detect all signaling frequencies present in the track rails, the output of said pickup coils being applied to said frequency responsive units, the output of each of said frequency responsive units being energized according to the presence of the frequency to which it is selectively responsive, the cumulative energization of said frequency responsive units controlling the speed of a train, the controlled speed of the train becoming more restrictive with a decrease in the number of frequencies received by the pickup coils as the train advances within said section.

7. A train speed control system for a track divided into a plurality of sections, each of said sections having at least two distinct control points for supplying alternating signaling current to control the speed of the train, said system comprising:

(a) means for supplying pulses of energy of a first frequency at a predetermined code rate to the track rails at a first control point adjacent the exit end of a section, the cycle of said pulses having an "on" portion and an "off" portion;

(b) means for supplying pulses of energy of a second frequency to the track rails at a control point intermediate the entrance and exit ends of said section, the pulses of energy of said second frequency being supplied during at least every other "off" portion of the cycle of said first frequency pulse;

(c) means for selectively supplying pulses of energy of a third frequency to the track rails at one of said control points, the pulses of energy of said third frequency being supplied during at least the alternate intervening "off" portions of the cycle of said first frequency pulse; and (d) train-carried means having a frequency responsive unit for each of said first, second and third frequencies, the output of said frequency responsive units being energized according to the presence of energy of the frequency to which it is selectively responsive, the cumulative energization of said frequency responsive units controlling the speed of the train, the controlled speed of the train becoming more restrictive with a decrease in the number of frequencies received by said train-carried means as the train advances within said section past the intermediate control point.

8. A train speed control system for a track divided into a plurality of sections, each of said sections having at least two distinct control points for supplying signaling current to control the speed of the train, said system comprising:

(a) means for supplying pulses of energy of a first frequency at a predetermined code rate to the track rails at a first control point adjacent the exit end of a section, the cycle of said pulses having an "on" portion and an "off" portion;

(b) means for supplying pulses of energy of a second frequency to the track rails at a control point intermediate the entrance and exit ends of said section, the pulses of energy of said second frequency being supplied during at least every other "off" portion of the cycle of said first frequency pulse;

(c) means for selectively supplying pulses of energy of a third frequency to the track rails at one of said control points, the pulses of energy of said third frequency being supplied during at least the alternate intervening "off" portions of the cycle of said first frequency pulse;

(d) receiving means connected to the track rails at the entrance end of said section and controlled by the pulses of energy of said first frequency; said receiving means actuating other means for altering the supply of coded energy in at least the next section in the rear; and (e) train-carried means having pickup coils, frequency responsive units and code responsive units, the pickup coils positioned in inductive relationship with the track rails in advance of the front wheels of a train to detect all signaling frequencies present in the track rails, the output of each of said frequency responsive units being energized according to the presence of energy of the frequency to which it is selectively responsive, a code responsive unit for each code rate in excess of one energized by the output of the first frequency responsive amplifier, each of said code responsive units being responsive only to one code rate of said first frequency, the cumulative energization of said frequency responsive units and code responsive units controlling the speed of a train, the controlled speed of a train being determined by the number of frequencies received by the pickup coils and the code rate of said first frequency within said section.

9. A train speed control system for a train running on a trackway divided into a plurality of sections, each of said sections having one of more distinct control points for supplying signaling current to the track rails to control the speed of the train, said system comprising:
  (a) means for supplying pulses of energy of a first frequency at a predetermined code rate to the track rails at a first control point adjacent the exit end of a section, the cycle of said pulses having an "on" portion and an "off" portion;
  (b) means for supplying pulses of energy of a second frequency to the track rails at a second control point spaced from and preceding said first control point, the pulses of energy of said second frequency being supplied during every other "off" portion of the cycle of said first frequency pulse;
  (c) means for supplying pulses of energy of a third frequency to the track rails at a third control point spaced from and preceding said second control point, the pulses of energy of said third frequency being supplied during the alternate intervening "off" portions of the cycle of said first frequency pulse;
  (d) receiving means connected to the track rails at the entrance end of said section and controlled by the pulses of energy received from said first frequency, said receiving means actuating other means for altering the supply of coded energy in at least the next section in the rear; and
  (e) train-carried means for detecting the presence of frequencies in the track rails in advance of the train and means to control the train in response to the presence of said frequencies, the controlled speed of the train becoming more restrictive as the train advances within the section and successively shunts the signaling frequencies associated with each control point.

10. A multi-aspect train signaling system for a railway track divided into a series of sections, said system supplying coded energy of a plurality of frequencies and code rates to the tracks, said system comprising:
  (a) means for supplying pulses of a master frequency at a predetermined code rate to the track rails adjacent the exit end of one of said sections, said pulses being of approximately equal "on-off" time;
  (b) means for supplying pulses of at least one other frequency during the "off" time of the pulses of said master frequency to the track rails at a point within said one section;
  (c) means for varying the code rate in said one section according to traffic conditions of sections in advance of said one section; and
  (d) train-carried means for detecting the pulses and selectively energizing frequency and code responsive units to indicate a signal aspect according to the frequency of the pulses detected and the code rate of the energy in said section.

11. A train speed control system for a continuous two-rail return trackway, said system comprising:
  (a) a plurality of impedance bonding devices having a primary winding, core means at least partially encircling said primary winding, and a secondary winding wound about said core means, said impedance bonding devices being spaced along the trackway and having the primary winding electrically connecting the two rails of said trackway at intervals, the length of trackway between a pair of impedance bonding devices defining a detector section having an entrance end and an exit end;
  (b) transmitting means for supplying coded alternating current energy of a given frequency to the track rails adjacent the impedance bonding device at the exit end of said detector section, the transmitting means of detector sections adjacent to said detector section transmitting at frequencies different from said given frequency to prevent interference between adjacent detector sections;
  (c) receiving means tuned to the transmitting frequency of said detector section and connected to the secondary winding of said impedance bonding device for receiving the trackway energy from the track rails adjacent the entrance end of said detector section, said receiving means being controlled by the energy received from said transmitting means to actuate other means for altering the transmission of coded energy in at least the next detector section in the rear; and
  (d) train-carried means having pickup coils in advance of the front wheels of the train in inductive relation with the track rails and being responsive to the received coded energy in advance of the train to control the speed of the train according to the code rate of the received energy.

12. A speed control system including a train running on a railway track divided into a plurality of sections, each section having the rails having means to supply the track with energy of a master frequency at a code rate dependent upon traffic conditions in advance of said section, the master frequency being supplied at the exit end of said section, means to supply said rails with trackway energy of one or more auxiliary frequencies at one or more points within said section, said system having train-carried apparatus including:
  (a) means for detecting said coded trackway energy of said master and auxiliary frequencies;
  (b) a plurality of frequency responsive amplifiers receiving said energy from said detecting means, each of said amplifiers being tuned to one of each of said master and auxiliary frequencies and having an output for the presence of the frequency to which it is tuned;
  (c) a frequency responsive decoding unit connected to the output of each of said amplifiers;
  (d) a code responsive decoding unit for each code rate in excess of one connected to the output of the master frequency responsive amplifier, each of said code responsive decoding units being responsive only to one code rate of the master frequency; and
  (e) switching means actuated by said frequency responsive and code responsive decoding units when energized to selectively apply the brakes and power to the train according to the combination of frequencies received by said detecting means and the code rate of the master frequency to control the speed of the train.

13. A speed control system for a train to which pulses of energy of a master frequency and two auxiliary frequencies are transmitted at first, second and third code rates, said master frequency being transmitted in pulses of approximately equal "on-off" time at a code rate determined by track occupancy conditions in advance of the train, the auxiliary frequencies being transmitted separately or alternately during the "off" time of the pulses of said master frequency, said system having train-carried apparatus comprising:
  (a) means for detecting the coded pulses of energy of said master and auxiliary frequencies;
  (b) a plurality of frequency responsive amplifiers receiving the energy from said detecting means, each of said amplifiers being tuned to one of each of said master and auxiliary frequencies and having an output for the presence of the frequency to which it is tuned;

(c) a frequency responsive decoding unit connected to the output of each of said amplifiers, the master frequency decoding unit responding to the presence of the master frequency at either the first, second or third code rate;

(d) a code responsive decoding unit for each of said second and third code rates and connected to the output of the master frequency responsive amplifier; and (e) switching means actuated by said frequency responsive and code responsive decoding units when energized to selectively apply the brakes and power to the train according to the combination of frequencies received by said detecting means and the code rate of the master frequency to control the speed of the train.

14. A speed control system for a train to which pulses of energy of a master frequency and two auxiliary frequencies are transmitted at first, second and third code rates, said master frequency being transmitted in pulses of approximately equal "on-off" time at a code rate determined by track occupancy conditions in advance of the train, the auxiliary frequencies being transmitted separately or alternately during the "off" time of the pulse of said master frequency, said system having train-carried apparatus comprising:

(a) pickup coils positioned in inductive relationship with the track rails in advance of the front wheels of a train to detect all signaling frequencies present in the track rails;

(b) a plurality of frequency responsive amplifiers receiving the energy from said pickup coils, each of said amplifiers being tuned to one of each of said master and auxiliary frequencies and having an output for the presence of the frequency to which it is tuned;

(c) a frequency responsive decoding unit connected to the output of each of said amplifiers, the master frequency decoding unit responding to the presence of the master frequency at either the first, second or third code rate;

(d) a code responsive decoding unit for each of said second and third code rates and connected to the output of the master frequency responsive amplifier; and (e) switching means actuated by said frequency responsive and code responsive decoding units when energized to selectively apply the brakes and power to the train according to the frequencies received by said detecting means and the code rate of the master frequency to control the speed of the train.

15. A zone speed control system including a train running on a railway track divided into a plurality of sections, said train receiving coded energy of one or more signaling frequencies at one or more code rates from the track rails to control the speed of the train according to the combination of different frequencies and different code rates, said system comprising:

(a) means for supplying energy of a frequency other than said signaling frequencies to the track rails at a point within the section, said point preceding the initial point of the speed zone by a sufficient distance to permit braking of the train from maximum permissible speed to the zoned speed;

(b) receiving means connected to the track rails within said section adjacent the terminal point of said speed zone, said receiving means being tuned to the transmission frequency of said first-mentioned means and being responsive thereto to maintain said receiving means in its energized condition; and (c) switching means connected to the output of said receiving means and actuated upon the deenergization thereof to alter the coded trackway energy at the exit end of said section to supply the track rails with coded energy to control the train to the speed of the zone, said switching means altering the coded trackway energy only when the speed of the zone is more restrictive than the speed dictated by the energy of said signaling frequencies.

16. A zone speed control system for a train running on a railway track divided into a plurality of sections, said train receiving coded energy of one or more signaling frequencies at one or more code rates from the track rails to control the speed according to the combination of different frequencies and different code rates, the speed zone extending through first and second sections, said system comprising:

(a) means for supplying coded signaling energy to the track rails adjacent the exit end of said first section, said signaling energy controlling the train to the zoned speed;

(b) means for supplying coded signal energy to the track rails at a point within said first section, said point preceding the initial point of the speed zone by a sufficient distance to permit braking of the train from maximum permissible speed to the zoned speed;

(c) means for supplying energy of a frequency other than said signaling frequencies to the track rails adjacent the entrance end of said second section;

(d) receiving means connected to the track rails within said second section adjacent the terminal point of said speed zone, said receiving means being tuned to the transmission frequency of the signal supply means of said second section and being responsive thereto to maintain said receiving means in an energized condition; and (e) switching means connected to the output of said receiving means and actuated upon the deenergization thereof to alter the coded trackway energy supplied to the track rails at the exit end of said second section and supply the track rails with coded energy to control the train to the speed of the zone, said switching means altering the coded trackway energy only when the speed of the zone is more restrictive than the speed dictated by the energy of said signaling frequencies.

17. A train speed control system for a continuous two-rail return trackway, said system comprising:

(a) a plurality of bonds spaced along the trackway and electrically connecting the two rails of said trackway at intervals, the length of trackway between adjacent bonds defining a section having an entrance end and an exit end;

(b) transmitting means having leads connected to the rails at a fixed distance from the bond at the exit end of said section, said leads extending from the points of connection at the rails to said bond, each of said leads being adjacent to and generally parallel to one of the track rails, said transmitting means supplying coded alternating current energy of a given frequency to the track rails, the transmitting means of sections adjacent to said section transmitting at frequencies different from said given frequency to minimize interference between adjacent sections;

(c) receiving means tuned to the transmitting frequency of said section and connected to the track rails adjacent the entrance end of said section, said receiving means being controlled by the energy received from said transmitting means to actuate other means for altering the transmission of coded energy in at least the next section in the rear; and (d) train-carried means having pickup coils in advance of the front wheels of the train in inductive relation with the track rails and being responsive to the received coded energy in advance of the train to control the speed of the train according to the code rate of the received energy, said pickup coils receiving energy from said leads after the train passes the points of connection of said leads until the train passes out of said section to provide continuity of speed control.

18. A train speed control system for a continuous two-rail return trackway, said system comprising:
   (a) a plurality of impedance bonding devices having a primary winding, core means encircling at least a part of said primary winding, and a secondary winding wound about said core means, said impedance bonding devices spaced along the trackway and having the primary winding electrically connecting the two rails of said trackway at intervals, two of said impedance bonding devices being spaced a relatively small distance apart to form the junction of a detector section, the length of trackway between adjacent pairs of impedance bonding devices defining a detector section having an entrance end and an exit end;
   (b) transmitting means for supplying coded alternating current energy of a given frequency to the secondary winding of the impedance bonding device at the exit end of said detector section, the transmitting means of detector sections adjacent to said detector section transmitting at frequencies different from said given frequency to prevent interference between adjacent detector sections;
   (c) receiving means tuned to the transmitting frequency of said detector section connected to the secondary winding of the impedance bonding device adjacent the entrance end of said detector section for receiving the trackway energy, said receiving means being controlled by the energy received from said transmitting means to actuate other means for altering the transmission of coded energy in at least the next detector section in the rear; and
   (d) train-carried means receiving coded energy from the track rails in advance of the train to selectively control the speed of the train according to the code rate of the received energy.

References Cited

UNITED STATES PATENTS

| | | | |
|---|---|---|---|
| 2,186,201 | 1/1940 | McFarland | 246—34 |
| 2,193,292 | 3/1940 | McDonald | 246—34 X |
| 2,287,108 | 6/1942 | Kemmerer | 246—63 |
| 3,041,449 | 6/1962 | Bingen | 246—182 |
| 3,145,957 | 8/1964 | Ihrig | 246—63 |
| 3,188,463 | 6/1965 | Hines | 246—182 |
| 3,218,454 | 11/1965 | Hughson | 246—182 |
| 3,218,455 | 11/1965 | Hughson | 246—63 X |
| 3,247,371 | 4/1966 | Gravin | 246—63 |

OTHER REFERENCES

Railway Signaling and Communications—Automatic Train Operation Tests, by London Transport, September 1963, pp. 16, 17, Simmons-Boardman, New York.

ARTHUR L. LA POINT, *Primary Examiner.*

S. B. GREEN, *Assistant Examiner.*